United States Patent [19]

Daniel et al.

[11] Patent Number: 4,823,345
[45] Date of Patent: Apr. 18, 1989

[54] METHOD AND APPARATUS FOR COMMUNICATION NETWORK ALERT RECORD IDENTIFICATION

[75] Inventors: Arthur A. Daniel, Rochester, Minn.; David R. Irvin, Raleigh; Robert E. Moore, Durham, both of N.C.

[73] Assignee: International Business Machines Corp., Armonk, N.Y.

[21] Appl. No.: 62,915

[22] Filed: Jun. 15, 1987

[51] Int. Cl.$^4$ ............................................. G06F 11/12
[52] U.S. Cl. ....................................... 371/37; 371/42; 371/40
[58] Field of Search ....................... 371/37, 38, 39, 40, 371/41, 42

[56] References Cited

U.S. PATENT DOCUMENTS

| | | | |
|---|---|---|---|
| 4,211,997 | 7/1980 | Rudwick | 371/40 |
| 4,276,646 | 6/1981 | Haggard | 371/37 |
| 4,481,648 | 11/1984 | Fujii | 371/42 |
| 4,709,367 | 11/1987 | Grafe | 371/38 |

Primary Examiner—Michael R. Fleming
Attorney, Agent, or Firm—Edward H. Duffield

[57] ABSTRACT

Alert records flowing in a communication and data processing network to host operator console stations consist of long, variable length information records. Method and apparatus are disclosed which reduce the variable length body of information to a standard 32-bit number which indexes the lengthy, variable length information. To the 32-bit number there is concatenated a product identification code which reduces the likelihood of inadvertent duplication of the 32-bit number by two different alert sending entities to an acceptable level. The IEEE standard 802 cyclic redundancy check algorithm, ordinarily employed for checking the integrity of data transmission in a communications system, is employed in a new way to reduce a long, variable length body of alert data information to the 32-bit number. Reduction of the alert record to a 32-bit number plus the product indentification code enables alert recognition and filtering to be conducted at the host/system network operator's console for logging, displaying the alert to specified operators, selective display, inhibitions of these or forwarding of the alert to an aditional operator or use of the alert as a triggering signal for the display of specific informational screens for the operator. Useless alerts in a particular environment may be discarded altogether and recognized prior to displaying them to the operator.

6 Claims, 19 Drawing Sheets

* NETWORK MANAGEMENT VECTOR TRANSPORT

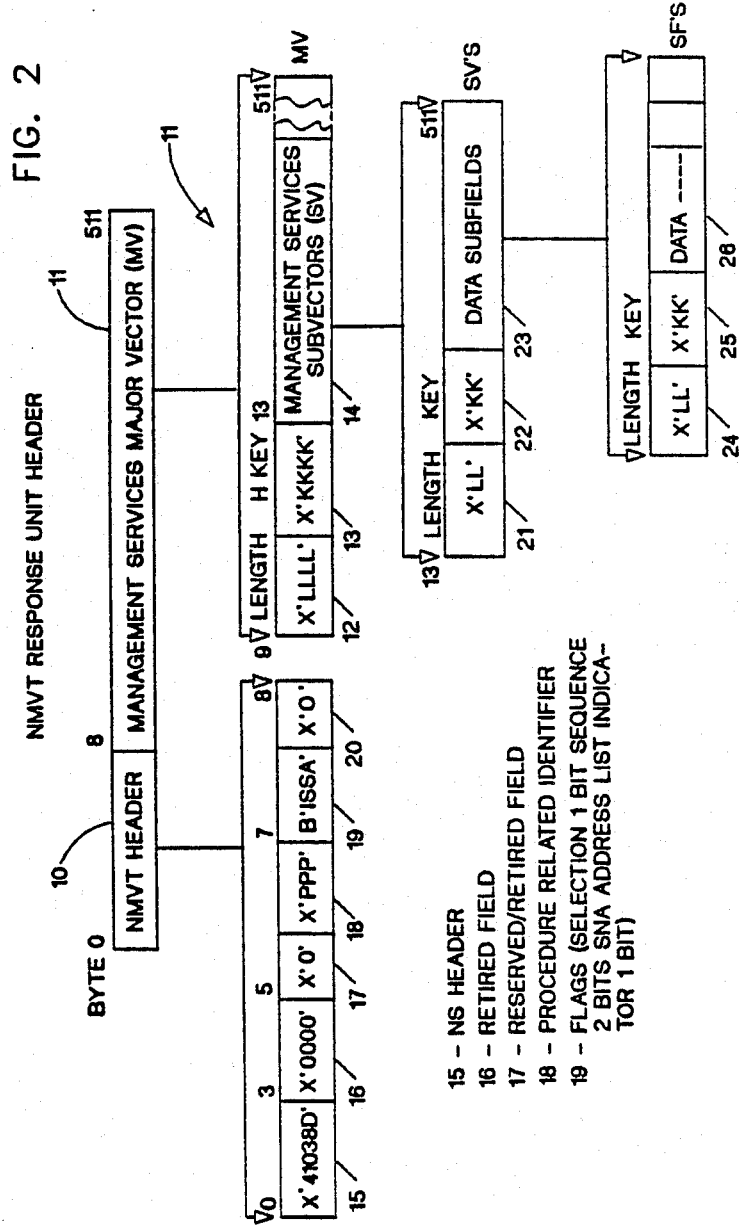

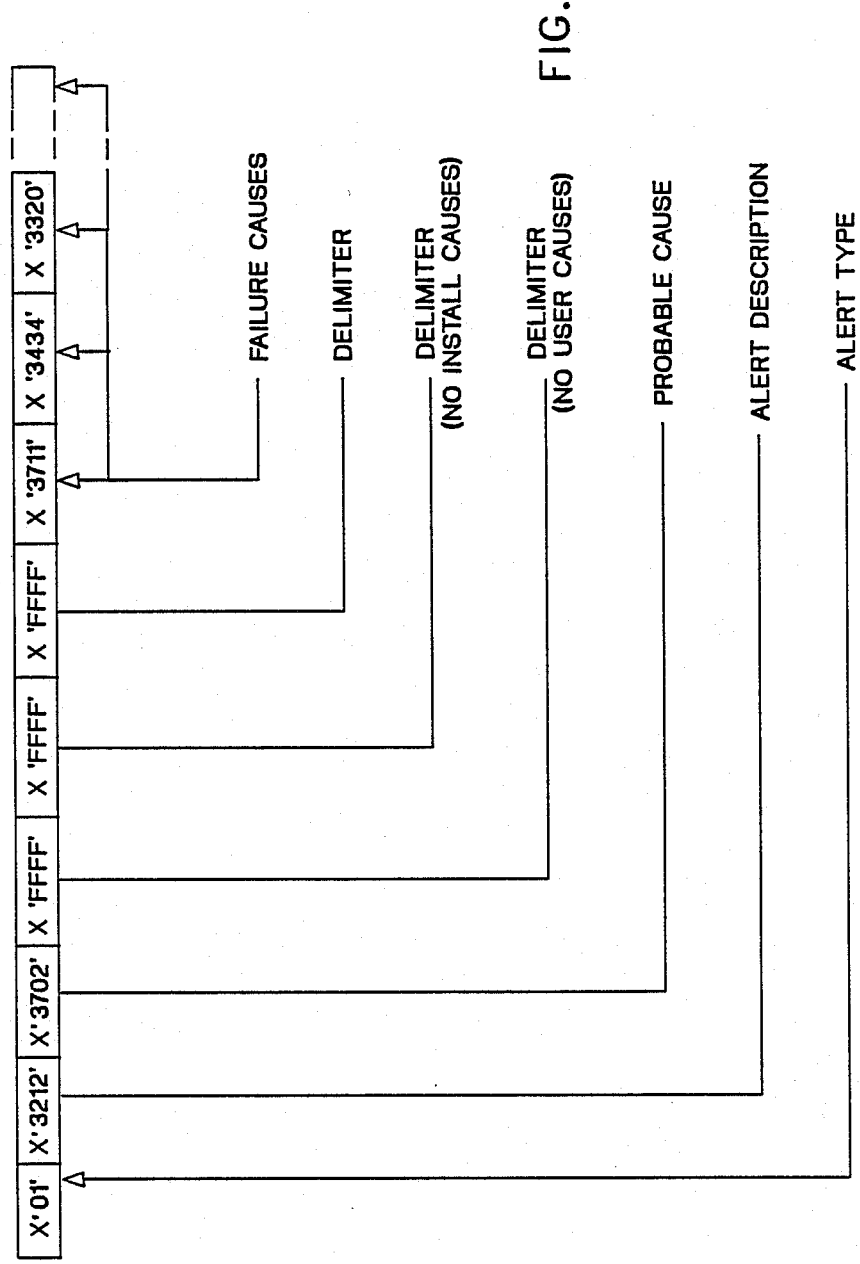

FIG. 6

| FIG. 6A |
|---|
| FIG. 6B |
| FIG. 6C |
| FIG. 6D |

FIG. 6A

| BYTE | BIT | VALUE | MEANING | |
|---|---|---|---|---|
| 0-2 | | X'41038D' | NMVT | NMVT HEADER |
| 3-4 | | X'0000' | (RETIRED) | |
| 5-6 | | X'0000' | (RESERVED/RETIRED/PRID) | |
| 7 | | B'0'<br>B'00'<br>B'00000' | UNSOLICITED<br>ONLY NMVT FOR THIS PRID<br>(RETIRED/RESERVED) | |
| 8-9 | | X'007D' | ALERT MAJOR VECTOR LENGTH | |
| 10-11 | | X'0000' | ALERT MAJOR VECTOR KEY | |
| 12 | | X'0A' | DATE/TIME SV LENGTH | DATE/TIME SUB-VECTOR |
| 13 | | X'01' | DATE/TIME SV KEY | |
| 14 | | X'08' | LOCAL DATE/TIME SF LENGTH | |
| 15 | | X'10' | LOCAL DATE/TIME SF KEY | |
| 16 | | X'yy' | LOCAL DATE: YEAR | |
| 17 | | X'mm' | LOCAL DATE: MONTH | |
| 18 | | X'dd' | LOCAL DATE: DAY | |
| 19 | | X'hh' | LOCAL TIME: HOURS | |
| 20 | | X'mm' | LOCAL TIME: MINUTES | |
| 21 | | X'ss' | LOCAL TIME: SECONDS | |

FIG. 6B

| | | | | |
|---|---|---|---|---|
| 22 | | X'19' | PRODUCT SET ID SV LENGTH | |
| 23 | | X'10' | PRODUCT SET ID SV KEY | |
| 24 | | X'00' | (RETIRED) | |
| 25 | | X'16' | PRODUCT ID SV LENGTH | |
| 26 | | X'11' | PRODUCT ID SV KEY | PSID SUB-VECTOR |
| 27 | | X'01' | (RESERVED)/IBM HARDWARE | |
| 28 | | X'13' | HARDWARE PRODUCT ID SF LENGTH | |
| 29 | | X'00' | HARDWARE PRODUCT ID SF KEY | |
| 30 | | X'12' | FORMAT TYPE | |
| 31+34 | | E'TTTT' | EBCDIC MACHINE TYPE | |
| 35-37 | | E'MMM' | EBCDIC MACHINE MODEL NUMBER | |
| 38-39 | | E'PP' | EBCDIC IBM PLANT OF MANUFACTURE | |
| 40-46 | | E'SSSS SSS' | EBCDIC MACHINE SEQUENCE NUMBER | |
| 47 | | X'1B' | HIERARCHY/RESOURCE LIST SV LENGTH | |
| 48 | | X'05' | HIERARCHY/RESOURCE LIST SV KEY | |
| 49 | | X'19' | HIERARCHY NAME LIST SF LENGTH | |
| 50 | | X'10' | HIERARCHY NAME LIST SF KEY | |
| 51 | | X'80' | FLAG BYTE (HIERARCHY NOT COMPLETE) | |
| 52 | | X'09' | LENGTH OF HNL ENTRY 1 | |
| 53-60 | | E'NNNN NNNN' | LAN NAME | HRL SUB-VECTOR |
| 61 | | X'40' | FLAG BYTE (DISPLAY RESOURCE NAME) | |
| 62 | | X'39' | RESOURCE TYPE=LAN | |
| 63 | | X'09' | LENGTH OF HNL ENTRY 2 | |
| 64-71 | | E'NNNN NNNN' | RING NAME | |
| 72 | | X'40' | FLAG BYTE (DISPLAY RESOURCE NAME) | |
| 73 | | X'2E' | RESOURCE TYPE = TOKEN RING | |

FIG. 6C

| | | | | |
|---|---|---|---|---|
| 74 | | X'0B' | GENERIC ALERT DATA SV LENGTH | GEN ALERT / SUBVECTOR |
| 75 | | X'92' | GENERIC ALERT DATA SV KEY | |
| 76-77 | 0<br>1<br>2<br>3-15 | B'0'<br>B'0'<br>B'0'<br>B'00..00' | FLAGS: NOT OPERATOR INITIATED<br>NOT HELD<br>NOT DELAYED<br>(RESERVED) | GEN DATA SUBVECTOR |
| 78 | | X'01' | ALERT TYPE = PERMANENT | |
| 79-80 | | X'3212' | ALERT DESCRIPTION = WIRE FAULT | |
| 81-84 | | X'A676 B230' | ALERT ID NUMBER (CALCULATED WITH THE 32-BIT CRC ALGORITHM) | |
| 85 | | X'04' | PROBABLE CAUSES SV LENGTH | PROB. CAUSES SUB-VECTOR |
| 86 | | X'93' | PROBABLE CAUSES SV KEY | |
| 87-88 | | X'3702' | PROBABLE CAUSES = TOKEN-RING LOBE | |
| 89 | | X'22' | FAILURE CAUSES SV LENGTH | FAIL CAUSES SUBVECTOR |
| 90 | | X'96' | FAILURE CAUSES SV KEY | |
| 91 | | X'08' | FAILURE CAUSES SF LENGTH | |
| 92 | | X'01' | FAILURE CAUSES SF KEY | |
| 93-94 | | X'3711' | FAILURE CAUSES = LOCAL ACCESS UNIT | |
| 95-96 | | X'3434' | FAILURE CAUSES = LOCAL LOBE CABLES | |
| 97-98 | | X'3320' | FAILURE CAUSES = LOCAL T.-R. ADAPTER | |
| 99 | | X'08' | RECOMMENDED ACTIONS SF LENGTH | |
| 100 | | X'81' | RECOMMENDED ACTIONS SF KEY | |
| 101-102 | | X'2010' | ACTION = REVIEW LINK DETAILED DATA | |
| 103-104 | | X'3101' | ACTION = CONTACT T.-R. ADMINISTRATOR RESPONSIBLE FOR THIS LAN | |
| 105-106 | | X'32C0' | ACTION = REPORT THE FOLLOWING: | |

ALERT ID GEN INPUT SOURCES

| | | | | |
|---|---|---|---|---|
| 107 | | X' 07' | DETAILED DATA SF LENGTH | |
| 108 | | X' 82' | DETAILED DATA SF KEY | |
| 109 | | X' 21' | PSID INDEX = SENDER'S HW | |
| 110 | | X' 61' | DATA ID = ADAPTER NUMBER | |
| 111 | | X' 11' | DATA ENCODING= EBCDIC (CHAR SET A +) | |
| 112-113 | | E' NN' | ADAPTER NUMBER | |
| 114 | | X' 09' | DETAILED DATA SF LENGTH | |
| 115 | | X' 82' | DETAILED DATA SF KEY | |
| 116 | | X' 21' | PSID INDEX = SENDER'S HW | |
| 117 | | X' 07' | DATA ID = ERROR CODE | |
| 118 | | X' 00' | DATA ENCODING = HEXADECIMAL | |
| 119-122 | | X' CCCC CCCC' | PRODUCT-UNIQUE ERROR CODE | |
| 123 | | X' 0A' | LAN LCS DATA SV LENGTH | |
| 124 | | X' 51' | LAN LCS DATA SV KEY | LAN LCS SUB-VECTOR |
| 125 | | X' 08' | LOCAL INDIV. MAC ADDRESS SF LENGTH | |
| 126 | | X' 03' | LOCAL INDIV. MAC ADDRESS SF KEY | |
| 127-132 | | X'aaaaaa aaaaaa' | LOCAL INDIVIDUAL MAC ADDRESS | |

FIG. 6D

| FIG. 7A |
|---|
| FIG. 7B |
| FIG. 7C |
| FIG. 7D |

MANAGEMENT SERVICES MAJOR VECTOR FORMATS

ALERT (X'0000') MS MAJOR VECTOR

> PU T2 —▷ SSCP
>
> THIS MAJOR VECTOR PROVIDES UNSOLICITED NOTIFICATION OF A PROBLEM OR IMPENDING PROBLEM, TYPE OF PROBLEM, IDENTIFICATION OF THE CAUSE, AND IDENTIFICATION OF THE COMPONENT THAT CAUSED THE PROBLEM.

LENGTH (n+1), IN BINARY, OF THIS MS MAJOR VECTOR
KEY: X'0000'
MS SUBVECTORS

| BYTE # | SUBVECTOR NAME | SUBVECTOR HEX ID X'NN' | PRESENCE IN NMVT ALERT (X'0000') MAJOR VECTOR | |
|---|---|---|---|---|
| 0-1 | TEXT MESSAGE | X'00' | O | NOTE 1 |
| 2-3 | DATE/TIME | X'01' | CP | NOTE 2 |
| 4-n | HIERARCHY NAME LIST | X'03' | CP | NOTE 3 |
|  | SNA ADDRESS LIST | X'04' | CP | NOTE 4 |
|  | HIERARCHY/RESOURCE LIST | X'05' | CP | NOTE 5 |
|  | PRODUCT SET ID | X'10' | P(n) | NOTE 6 |
|  | SELF-DEFINING TEXT MSG. | X'31' | O |  |
|  | RELATIVE TIME | X'42' | CP | NOTE 7 |

COMMON SUBVECTORS

FIG. 7B

| | | | | |
|---|---|---|---|---|
| | LAN LINK CONNECTION SUBSYSTEM DATA | X'51' | CP | NOTE 8 |
| | LCS CONFIGURATION DATA | X'52' | CP | NOTE 9 |
| | SDLC LINK STATION DATA | X'8C' | CP | NOTE 10 |
| | BASIC ALERT | X'91' | O | NOTE 11 |
| | GENERIC ALERT DATA | X'92' | P | |
| | PROBABLE CAUSES | X'93' | P | |
| | USER CAUSES | X'94' | CP | NOTE 12 |
| | INSTALL CAUSES | X'95' | CP | NOTE 12 |
| | FAILURE CAUSES | X'96' | CP | NOTE 12 |
| | CAUSE UNDERTERMINED | X'97' | CP | NOTE 13 |
| | DETAILED DATA | X'98' | O | |
| | DETAIL QUALIFIER | X'A0' OR X'A1' | O(n) | NOTE 14 |

ALERT ID GENERATION INPUT SOURCE SUBVECTORS

KEY:

- P    PRESENT ONE TIME
- P(n)   PRESENT ONE OR MORE TIMES
- CP   CONDITIONALLY PRESENT ONE TIME (SEE NOTES FOR CONDITIONS.)
- O    OPTIONALLY PRESENT ONE TIME
- O(n)   OPTIONALLY PRESENT ONE OR MORE TIMES

NOTES:

1. THIS SUBVECTOR MAY BE OPTIONALLY INCLUDED BY AN ALERT SENDER, TO TRANSPORT TEXT IN A SINGLE ALERT MAJOR VECTOR THAT CAN BE PROCESSED BY BOTH A PRE-GENERIC ALERT AND A GENERIC ALERT FOCAL POINT. IF THIS SUBVECTOR IS PRESENT, THE X'91' SUBVECTOR MUST ALSO BE PRESENT.

2. IF THE PU SENDING THE ALERT MAJOR VECTOR HAS THE CAPABILITY OF PROVIDING IT, IT PLACES THIS SUBVECTOR IN THE NMVT. SEE NOTE 7.

3. THIS SUBVECTOR MAY BE OPTIONALLY INCLUDED IN THE NMVT BY AN ALERT SENDER IN ORDER TO CREATE A SINGLE ALERT MAJOR VECTOR THAT CAN BE PROCESSED BY BOTH A PRE-GENERIC ALERT AND A GENERIC ALERT FOCAL POINT. WHEN IT IS PRESENT, THIS SUBVECTOR IDENTIFIES AN ORIGIN OF THE CONDITION THAT IS NOT AN SNA NETWORK ADDRESSABLE UNIT. IF THIS SUBVECTOR IS PRESENT, THE X'91' SUBVECTOR MUST ALSO BE PRESENT.

4. THIS SUBVECTOR IS PRESENT WHEN IT IS NECESSARY TO IDENTIFY, WITH AN SNA ADDRESS, THE ORIGIN OF THE ALERT CONDITION. IF THE ORIGIN OF THE ALERT CONDITION IS THE PU SENDING THE ALERT, THIS SUBVECTOR IS NOT PRESENT.

5. THIS SUBVECTOR IS PRESENT IN THE NMVT INSTEAD OF, OR IN ADDITION TO, THE SNA ADDRESS LIST (X'04') SUBVECTOR IF THE ORIGIN (OTHER THAN THE PU SENDING THE ALERT) OF THE ALERT CONDITION CANNOT BE REPRESENTED IN THE SNA ADDRESS LIST (X'04') SUBVECTOR.

6. AN INSTANCE OF THIS SUBVECTOR DESCRIBING THE PU SENDING THE ALERT IS ALWAYS PRESENT. A SECOND INSTANCE IS PRESENT IF THE ORIGIN OF THE ALERT CONDITION IS A HARDWARE OR SOFTWARE PRODUCT, AND IS NOT THE PU SENDING THE ALERT. IF A SECOND INSTANCE IS PRESENT, IT IS PLACED IMMEDIATELY AFTER THE FIRST INSTANCE OF THE (X'10') SUBVECTOR.

IN AN ALERT CONTAINING TWO INSTANCES OF THE PRODUCT SET ID SUBVECTOR, THE FOLLOWING TERMS REFER, RESPECTIVELY, TO THESE TWO INSTANCES:
- "ALERT SENDER PSID"—IDENTIFIES THE PU SENDING THE ALERT

- "INDICATED RESOURCE PSID"—IDENTIFIES THE RESOURCE THAT IS BEING ALERTED UPON

IN AN ALERT WITH ONLY ONE INSTANCE OF THE PRODUCT SET ID, THIS INSTANCE IS REFERRED TO BOTH AS THE ALERT SENDER PRODUCT SET ID AND AS THE INDICATED RESOURCE PRODUCT SET ID.

FIG. 7C

7. IF THE PU SENDING THE ALERT CONNOT PROVIDE A DATE/TIME (X'01') SUBVECTOR, IT PLACES THIS SUBVECTOR IN THE NMVT INSTEAD.

8. THIS SUBVECTOR IS PRESENT WHEN THE ALERT REPORTS AN ERROR ON A LAN, AND THE NODE SENDING THE ALERT IS ATTACHED TO THE LAN.

9. THIS SUBVECTOR IS PRESENT WHEN THE ALERT REPORTS A PROBLEM WITH A LOGICAL LINK USING THE SDLC OR LAN LLC PROTOCOL.

10. THIS SUBVECTOR IS PRESENT WHEN THE ALERT REPORTS A PROBLEM WITH A LOGICAL LINK USING THE SDLC OR LAN LLC PROTOCOL.

11. THIS SUBVECTOR MAY BE OPTIONALLY INCLUDED BY AN ALERT SENDER IN ORDER TO CREATE A SINGLE ALERT MAJOR VECTOR THAT CAN BE PROCESSED BY BOTH A PRE-GENERIC ALERT AND A GENERIC ALERT FOCAL POINT.

12. ANY OR ALL OF THESE SUBVECTORS ARE PRESENT IN AN ALERT, DEPENDING ON THE PROBABLE CAUSES OF THE ALERT CONDITION IDENTIFIED BY THE ALERT SENDER.

13. THIS SUBVECTOR IS PRESENT IN AN ALERT IF AND ONLY IF NONE OF THE X'94', X'95', AND X'96' SUBVECTORS ARE PRESENT.

14. UP TO A TOTAL OF THREE INSTANCES OF THESE SUBVECTORS MAY BE OPTIONALLY INCLUDED BY AN ALERT SENDER, IN ORDER TO CREATE A SINGLE ALERT MAJOR VECTOR THAT CAN BE PROCESSED BY BOTH A PRE-GENERIC ALERT AND A GENERIC ALERT FOCAL POINT. IF EITHER OF THESE SUBVECTORS IS PRESENT, THE X'91' SUBVECTOR MUST ALSO BE PRESENT.

| FIG. 8A |
| FIG. 8B |
| FIG. 8C |
| FIG. 8D |

FIG. 8A

GENERIC ALERT DATA (X'92') ALERT MS SUBVECTOR

THIS SUBVECTOR TRANSPORTS ALERT INFORMATION IN THE FORM OF CODE POINTS THAT CORRESPOND TO STRINGS OF TEXT STORED AT THE ALERT RECEIVER. IT ALSO TRANSPORTS AN ALERT ID NUMBER THAT UNIQUELY IDENTIFIES A PARTICULAR ALERT.

| BYTE # | |
|---|---|
| 0 | LENGTH (P+1), IN BINARY, OF THE GENERIC ALERT DATA SUBVECTOR |
| 1 | KEY: X'92' |
| 2-3 | FLAGS: |
| | BIT 0, INITIATE INDICATOR: |
| |     0 ALERT WAS NOT DIRECTLY INITIATED BY AN OPERATOR ACTION |
| |     1 ALERT WAS INITIATED BY AN OPERATOR ACTION |
| | BIT 1, HELD ALERT INDICATOR: |
| |     0 ALERT WAS SENT WHEN THE PROBLEM WAS DETECTED |
| |     1 ALERT CONDITION WAS DETECTED EARLIER, BUT THE ALERT WAS NOT SENT AT THAT TIME BECAUSE THERE WAS NO SESSION AVAILABLE TO SEND IT ON |

BIT 2, DELAYED ALERT INDICATOR:
  0 SENDER IS NOT REPORTING A PRIVIOUSLY DE-
    TECTED ALERT CONDITION THAT PREVENTED RE-
    PORTING WHEN DETECTED

1 SENDER IS REPORTING A PREVIOUSLY DETECTED
    ALERT CONDITION THAT PREVENTED REPORTING
    WHEN DETECTED

NOTE: IF THE DELAYED ALERT INDICATOR IS SET
        TO 1, THE HELD ALERT INDICATOR MUST
        ALSO BE SET TO 1.

BITS
3-15, RESERVED

4  ALERT TYPE: A CODE POINT INDICATING THE SEVERITY
   OF THE ALERT CONDITION.

DEFINED CODES ARE:

X'01' PERMANENT LOSS OF AVAILABILITY: A LOSS OF
         AVAILABILITY TO THE END USER THAT IS NOT
         RECOVERED FROM WITHOUT INTERVENTION
         EXTERNAL TO THE REPORTING PRODUCT

X'02' TEMPORARY LOSS OF AVAILABILITY: A
         MOMENTARY LOSS OF AVAILABILITY THAT WILL
         PROBABLY BE NOTIFIED BY THE END USER, YET
         IS RECOVERED FROM WITHOUT INTERVENTION
         EXTERNAL TO THE REPORTING PRODUCT

X'03' PERFORMANCE: PERFORMANCE IS BELOW WHAT
         IS CONSIDERED AN ACCEPTABLE LEVEL

X'11' IMPENDING PROBLEM: A LOSS OF AVAILABILITY
         TO THE END USER IS IMPENDING BUT HAS NOT
         YET HAPPENED

X'12' UNKNOWN: IT IS IMPOSSIBLE TO ASSESS THE
         SEVERITY OF THE ALERT CONDITION

FIG. 8B

| 5-6 | ALERT DESCRIPTION CODE: A CODE POINT THAT PROVIDES AN INDEX TO PREDEFINED TEXT DESCRIBING THE ALERT CONDITION. AN ALERT RECEIVER HAS TWO OPTIONS FOR SELECTING TEXT TO DISPLAY. IT CAN DISPLAY THE ENGLISH TEXT DOCUMENTED WITH EACH CODE POINT, OR ITS NATIONAL LANGUAGE EQUIVALENT, OR, FOR A PRESENTATION TO AN OPERATOR OF A LOWER SKILL LEVEL, IT CAN CHOOSE THE FOLLOWING SIMPLER TEXT, OR ITS NATIONAL LANGUAGE EQUIVALENT, BASED ONLY ON THE FIRST DIGIT OF THE CODE POINT:<br><br>X'1xxx'  HARDWARE<br>X'2xxx'  SOFTWARE<br>X'3xxx'  COMMUNICATIONS<br>X'4xxx'  PERFORMANCE<br>X'5xxx'  CONGESTION<br>X'6xxx'  MICROCODE<br>X'7xxx'  OPERATOR<br>X'8xxx'  SPECIFICATION<br>X'9xxx'  INTERVENTION REQUIRED<br>X'Axxx'  PROBLEM RESOLVED<br>X'Bxxx'  NOTIFICATION<br>X'Cxxx'  SECURITY<br>X'Fxxx'  UNDETERMINED<br><br>DEFINED CODES ARE:<br><br>    (OMITTED FOR SIMPLICITY) |
|---|---|

FIG. 8C

| BYTE # | |
|---|---|
| 7-10 (=p) | ALERT ID NUMBER: A FOUR BYTE HEXADECIMAL VALUE COMPUTED AS FOLLOWS:<br><br>STAGE 1: ASSEMBLE (IN ORDER) THE FOLLOWING INPUT FROM THE ALERT MAJOR VECTOR:<br><br>• ALERT TYPE<br>• ALERT DESCRIPTION CODE<br>• ALL PROBABLE CAUSES CODE POINTS, IN ORDER<br>• THE DELIMITER X'FFFF'<br>• ALL USER CAUSES CODE POINTS, IN ORDER, IF ANY ARE PRESENT<br>• THE DELIMITER X'FFFF'<br>• ALL INSTALL CAUSES CODE POINTS, IN ORDER, IF ANY ARE PRESENT<br>• THE DELIMITER X'FFFF'<br>• ALL FAILURE CAUSES CODE POINTS, IN ORDER, IF ANY ARE PRESENT<br><br>STAGE 2: APPLY TO THIS INPUT THE 32 BIT CRC ALGORITHM<br><br>$$\frac{(X^{**}32) * I(X) + (X^{**}k) * L(X)}{G(X)} = Q(X) + \frac{R(X)}{G(X)}$$<br><br>WHERE $I(X)$ = THE POLYNOMIAL REPRESENTED BY THE INPUT (WITH THE CONVENTION THAT THE FIRST BIT OF THE INPUT REPRESENTS THE COEFFICIENT OF THIS POLYNOMIAL'S <u>HIGHEST</u> ORDER TERM), $L(X)$ = THE POLYNOMIAL $X^{}31 + X^{}30 + ... + X + 1$ (i.e., THE POLYNOMIAL REPRESENTED BY 32 1's), k = THE NUMBER OF BITS IN THE INPUT, AND $G(X)$ = THE GENERATOR POLYNOMIAL $X^{}32 + X^{}26 + X^{}23 + X^{}22 + X^{}16 + X^{}12 + X^{}11 + X^{}10 + X^{}8 + X^{}7 + X^{}5 + X^{}4 + X^{}2 + X^{}1 + 1$. THE ALERT ID NUMBER IS DEFINED TO BE THE <u>COMPLEMENT</u> OF THE NUMBER REPRESENTING THE REMAINDER POLYNOMIAL $R(X)$. |

FIG. 8D

METHOD AND APPARATUS FOR COMMUNICATION NETWORK ALERT RECORD IDENTIFICATION

FIELD OF THE INVENTION

This invention relates to data processing and communications systems in general and specifically to network control stations and systems in which problem condition alert signals and messages are sent from operating entities in the network to the network system operator console at the network management control program host.

PRIOR ART

Problem alerts in communication and data processing network systems which communicate using alerts to a central operator's console at a controlling CPU station are known. Currently, each alerting product must create and arrange for the storage of product unique screens at the problem management console control point. These screens are then invoked when a given alert is received to inform the operator as to what problem or condition is being reported. Substantial effort is involved in developing the product unique screens and in implementing them in a coordinated fashion. Furthermore, the amount of storage required to maintain a record of the screens at the control points and the amount of synchronization imposed on the shipment of products by the manufacturers in the creation and distribution of the product unique alert screens for the host system consoles have made this approach highly unacceptable.

Alert messages independent of a particular product are been proposed for use as described in commonly-assigned copending application Ser. No. 63,618 filed simultaneously herewith. These may be termed "generic alerts". They provide a new approach for the transportation and display of information in the form of alert messages at the network control program management console. Generic alerts can be used to index predefined tables that contain relatively short units of text messages to be used in building an operator's information display. Furthermore, the generic alerts may contain textual data for direct display. In both cases, the data is wholly independent of the specific alerting product insofar as the network control program management console processing task is concerned.

However, some form of identification or indexing of the alert text codes must be provided. In the pst, using the so-called stored screen alerts discussed briefly above, an identifying index is specified for each unique alert. Sets of previously agreed-upon display screens were encoded and stored at the operator control console and a unique alert identification was sent with each alert to the operator's console. This enabled the processor at the operator console to identify which screen was being asked for by the alert sender. An alert from an IBM 3274 would, for example, carry a number such as X'08' (hexadecimal). It would also carry an indication that the alert is from a 3274 controller. Based upon this information, the processor at the control console would retrieve and display a set of information display screens for a 3274 and would select from those screens screen number 8 for immediate display. The index, i.e., the identification of a 3274 as the sender and X'08' as a screen identification is available for use in alert filtering, a task that will be discussed briefly below, but which enables easy recognition of a specific alert for handling of the alert in different ways.

For the so-called generic alerts, however, a problem exists in that there is no natural analog to this type of index system. In generic alert systems, the senders of the alerts select from predefined and published code points to build alert messages. These are subsequently used at the receiver for building a display screen for the operator. There is, however, no single identification number or code that identifies a particular alert for filtering purposes.

OBJECTS OF THE INVENTION

In light of the foregoing known problems and difficulties with the prior art, it is an object of this invention to provide an improved generic alert code generation and identification method and apparatus that can identify a particular generic alert for filtering or other similar purposes.

SUMMARY

A new method and apparatus for generating alert identification numbers which are unique to a specific, variable length alert message is set forth herein. Typically, depending upon the particular problem that exists in a given system or network component, alert messages may be a data record of from several to as many as 512 bytes of information. The reduction of the long, variable length records to a standard 32-bit number is achieved in the invention disclosed herein by a new use for the well-known IEEE 802 standard Cyclic Redundancy Checking algorithm. This algorithm is used herein to map the long, variable length alert record data bodies into standard 32-bit numbers representing one form of an indexing or identification code. To these numbers is appended or concatenated a product identification code that further reduces the probability of the inadvertent duplication of an identification code by different products generating different alert messages through application of the CRC algorithm. A method and apparatus are provided for selecting from the long, variable length data records that constitute alert messages from a given alert sender, a specific set of data entry fields for queued entry into a data buffer. These data elements are the alert type identification code, the alert description code, the probable causes codes, a delimiter, the user causes codes, a further delimiter, the installation causes codes, a delimiter and finally, all failure cause codes. The content of this buffer is then delivered, in order, to the cyclic redundancy check algorithm processor. These processors are commercially available in the form of integrated circuit chips or may be standard programs for use in general purpose signal processor or data processor machines according to the IEEE standard 802 process. The output of the cyclic redundancy checking algorithm is a 32-bit binary number that may be associated with the unique buffer entry. With the resulting unique 32-bit number, additional steps are made by appending to it a product identification code. The result is an index or identification code for the specific variable length alert message that can be used to identify the alert message to the network operator control console processor in a rapid and unambiguous fashion.

BRIEF DESCRIPTION OF THE DRAWINGS

The foregoing and still other unenumerated objects of the invention are met in a preferred embodiment thereof as depicted in the drawing in which:

FIG. 2 illustrates the format for the architecturally defined Network Management Vector Transport request unit employed in the preferred embodiment for communication of the alert messages.

FIG. 4 illustrates schematically the buffer content for a specific example of an alert message.

FIG. 6 and 6A-6D illustrates in complete detail a specific example of a total generic alert message sent to report a wire fault in the system depicted in FIG. 5.

FIG. 7 and 7A-7D illustrate the major vector format to be employed in the standard NMVT messages.

FIG. 8 and 8A-8D illustrate one of the subvector formats to be employed in the standard NMVT messages.

DETAILED SPECIFICATION

Figure 1A:
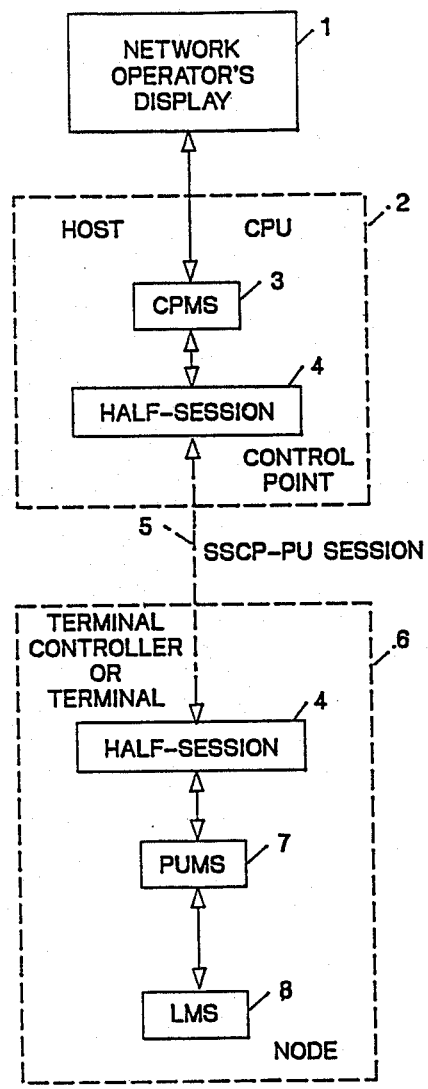
FIG. 1A illustrates schematically an architectural arrangement of the communication and data processing system in an IBM SNA architecturally defined environment.

As alluded to briefly above, the invention finds its application in the present-day complex communication and data processing networks in which a variety of devices or products suffering from a similar variety of inherent possible problems must be managed from central control points by system control operators. In a typical IBM SNA architected system, the network control functions are provided by a variety of management tools and processes. Among these offered in an SNA system are automatic detection, isolation and notification to system operators of existing resource problems. For an overview of such systems, reference may be had to a paper entitled "Problem Detection, Isolation and Notification in Systems Network Architecture" appearing in the Conference Proceedings, IEEE INFOCOM 86, Apr. 19, 1986.

As discussed at greater length in the referenced paper, the strategic vehicle for accomplishing the automatic detection, isolation and notification to the system operator in an SNA network is the Network Management Vector Transport alert. This alert is an architecturally defined and published data communication format with specifically defined contents. Each individual product throughout an SNA network is responsible for detecting its own problem, performing analysis for isolating the problem and for reporting the results of the analysis in alert messages sent to the system control operator. In some cases, a problem may be isolated to a single failing component in the network and the failing component will be identified in the alert message. If the failure can be further isolated, for example, to a specific element within a failing component, then the element may also be identified in the alert message. In other cases where it is not possible for the detecting product to isolate the failure to a network component, the problem detecting product will send information that will assist the network operator at the system control console to complete isolation of the failure to a single component. Examples of problems that can be detected are components in an SNA network are given in the aforementioned paper. The data that flows in the alert messages reporting the problems is also specifically described. The IBM program product, Network Problem Determination Application (NPDA) which is an IBM program product that presents alert data to a network operator, is also discussed in brief.

As briefly alluded to, in an SNA network the alert message is the vehicle for notifying the network operator that a problem exists within the network. Products throughout the SNA network are responsible for detecting problems and reporting them via alert messages so that operators at the central control terminal, usually located at the host system site, can be aware of problems in all parts of the network. However, the alert message typically performs more functions than the simple enunciation of the existence of problems. It also transports data that assists the network operators in isolating and in ultimately resolving the identified problems. The alerting task is applicable to all of the resources in the network. Thus, it makes it possible for an operator at the central control facility to manage not only the communications resources of the network such as the controllers, communication links, modems and the like, but also to manage such system resources as tape drive units and Direct Access Stored Data units (DASD) and printers, for example. Typically, such system resource hardware components do not send their own alert messages since they are not provided with the sophisticated problem detection and isolation mechanisms together with processing capability to construct and send the alert messages. Such system resources usually have alerts sent on their behalf by the network component to which they are attached, for example, to an attached controller for a printer, DASD unit, or the like.

As discussed in the aforementioned paper, the alert message is encoded and formatted in an architecturally defined and published manner and is known as the Network Management Vector Transport (NMVT) message when it flows through such a network. As such, the alert message consists of a Major Vector (MV) with an identification that identifies the message as an alert and a number of included Subvectors (SV) that transport the various types of alert data to the control point. The major vector/subvector encoding scheme has several advantages. First, since the format for the message length is variable rather than fixed, an alert with less data than another need not carry O's or padding characters in unused data fields. If the data to be transported by a given subvector is not present in an alert from a given product, that subvector is simply omitted altogether. Secondly, since products that receive alerts, such as IBM's NPDA product mentioned above, may parse or analyze a major vector and its subvectors, migration to newer versions of the management program products is simplified whenever additional data is added to the alert messages. The new data is simply encoded in a new subvector and the only change necessary to the management program is the addition of recognition support for the new subvector.

In the context of such alert message management systems, an important feature alluded to previously is the filtering of alerts. Filtering is defined as a procedure in which certain message units or specific alerts are selected for exclusion or for different treatment at the alert receiving station, i.e., at the network control console operator's display. Differences in treatment for specific alert messages may be as follows:

The specific alert message may be excluded from an alert log and/or from the alert display at the operator's station. Ordinarily, each alert is logged and presented to the operator as it arrives. Filters may be set, however, to specify that a particular alert should be logged only for later retrieval but not displayed for the operator immediately or perhaps not even logged. The filtering operation for particular alerts allows enablement or inhibition of the functions of logging an individual alert, displaying the alert to a specified operator, forwarding the alert to another control point for handling, or of the use of the alert as a trigger mechanism for the displaying of special display screens in place of those normally used at the control console station. Alert messages that a given user deems useless for a particular network can be discarded altogether while others can be routed first to the appropriate node or station within the network and then to the appropriate operator at that node for handling.

For certain network configurations or user installations, a particular alert message may never be useful. In such cases, a filter can be permanently set at the alert receiver console to discard without logging or displaying them any instances when that alert message is received. Additionally, there may be certain exceptional circumstances, typically such as scheduled maintenance intervals, in which the alert that is generated is ordinarily useful and meaningful but is temporarily of no value. In this case, the filter may be temporarily set to discard any instances of the alert that are received during the maintenance period. The filtering capability is especially important because, for certain types of maintenance procedures, numerous instances of the same alert can be generated in a very short period of time.

As alluded to above, the current implementation of alert messages is based upon product unique screens which are stored at the control point operator's station which is typically connected to a host or in a network control console processor. However, considerable effort is involved in developing the unique screens and in synchronizing their usage with the implementation of given products in a network composed of numerous products from numerous suppliers. Generic alerts provide a more flexible approach to the transport and display of information in message alerts to the control point or system control operator's station. In generic alerts, the data can be transported in a coded form within an alert message and the network control point product, such as IBM's NPDA can use the coded data in at least two ways. First, the coded data can be used as an index to predefine tables containing short units of text to be used in building the display for the operator. Secondly, the textual data to be displayed can be defined by the alert data itself. In each case, however, the data displayed is wholly independent of the product associated with the cause of the specific alert insofar as the processing of the received message is concerned. The indexing of text strings by the specifically defined and encoded code points contained within the string and the displaying of textual data messages sent in such an alert are done in exactly the same manner regardless of which product caused the sending of the alert.

As stated earlier, generic alerts in the present invention are encoded in the architecturally defined and published major vector/subvector/subfield format. This format is schematically illustrated in FIG. 2 and is defined in the IBM publication GA27-3136, first published in 1977. The latest versions of this publication contain completely detailed lists of each possible code point for each specific type of error for each specific type of product in a communication and data processing network. The use of the architecturally defined format, unlike fixed format schemes, makes possible the inclusion in a particular alert message of only those elements that are necessary. Subvectors and subfields of data that are not required are simply not included. The encoding scheme as published and defined is currently in use for most SNA management services records in the IBM systems. However, to perform the filtering function and to identify specific multi-character variable length alert messages, some means of providing a unique identification for each alert message is necessary. For the architecturally defined variable length messages as alluded to, thee is no single number that identifies a particular alert for filtering purposes. The present invention provides a method and apparatus for creating such an identification number.

FIG. 1A illustrates a typical architectural environment for an SNA data and communication network. Typically, the operator's display console indicated as box 1 in FIG. 1A is connected to a host CPU 2 which operates a control point management service program illustrated as CPMS 3 which communicates with session control program 4 internally in the host CPU 2. The session control program 4 operates using the Network Management Vector Transport response unit format over the communications link 5 to establish the SSCP-PU SNA session. The physical unit (PU) may typically be a terminal controller or a terminal itself if the terminal is provided with sufficient processing capacity. The terminal controller or terminal will contain the SNA session control program portion 4 necessary to establish the partner SNA half session as illustrated in FIG. 1A. The terminal controller or terminal itself 6, as shown in FIG. 1A, will also contain a processor (not shown) operating a management services program for the physical unit itself. This is illustrated as the physical unit management services program block 7 which communicates with local management services program 8 to manage a given terminal or controller. For the architected system of FIG. 1A, the typical physical example is given by FIG. 1B. The operator's console 1, which may be a typical 3270 display station and keyboard, is connected to a System/370 host CPU 2 containing the appropriate control point management services program 3 in the form of IBM's network management control program offering NPDA or other similar versions of network management control programs. The SNA session control is managed by a virtual telecommunications access method such as IBM's VTAM program also operating within the System/370 host.

The communications link 5 links the host to a plurality of elements in the communication network. Only one element, a typical IBM 3174 terminal controller is illustrated as the physical unit 6 which contains the necessary programming to support the SNA session, (illustrated as the half session control program portion 4 in FIG. 1A), the physical unit management services program 7 and the local management services program 8 for operating the attached terminals 9 and for reporting problem alert conditions relative either to the terminal controller 6 or to the terminals 9.

The communications link 5 typically links the controller 6 to the host 2 and, of course, numerous such controllers and terminals may exist within a typical complex network.

An architecturally defined and published format for the communication is the Network Management Vector Transport (NMVT) request unit format shown in some detail in FIG. 2. This format is used for the communications of alert messages.

Briefly, the NMVT request unit format comprises a header portion of information 10 followed by the management services major vector portion 11. The total NMVT request unit may contain up to 511 bytes of information and so has a highly variable length and data content. As schematically shown, the NMVT header 10 contains a plurality of subfields of information with bytes 0 through 2 comprising a portion identified as the NS header. Bytes 3 and 4 comprise a field of information that has been retired from use identified as field 16. Field 17 comprising bytes 5 is reserved or retired and field 18 is a procedure related identifier. Bytes 7 and 8 represent data fields 19 and 20 with field 19 being for indicator flags' sequence field, and SNA address list indicators as shown in the drawing. Field 20 is a reserved field.

The management services major vector portion 11, may be further broken down into fields 12 through 14 as schematically depicted in FIG. 2. A length indicator comprising bytes 9 and 10 contains a pointer pointing to the end point of field 14. A key indicator comprising bytes 11 and 12 specifies the particular type of major vector as will be further described. The management services subvector field 14 may contain a plurality of bytes of data specifically selected to represent the problem conditions to be reported. The specific selection is in accordance with the published and defined specification previously noted in the publication GA27-3136.

The management services subvector field 14 may be further broken down into specific subvectors, each of which may be identified by fields 21 and 22 as having a specific length and a specific type with the data field 23 containing specific subfields of data. The data subfield 23 may be further broken down into subfields within the data each having a length field 24, an identification key field 25 and subsequent data fields 26.

As may be readily appreciated, high degree of flexibility of encoding data points to construct an alert message is made possible in this system. However, it will be noted that the alert messages constructed in this format contain no unique fixed length identifier to describe to the receiving management for operator console which specific alert has been encoded. The alert identification number generation apparatus and method of the present invention create this number.

Figure 1B:
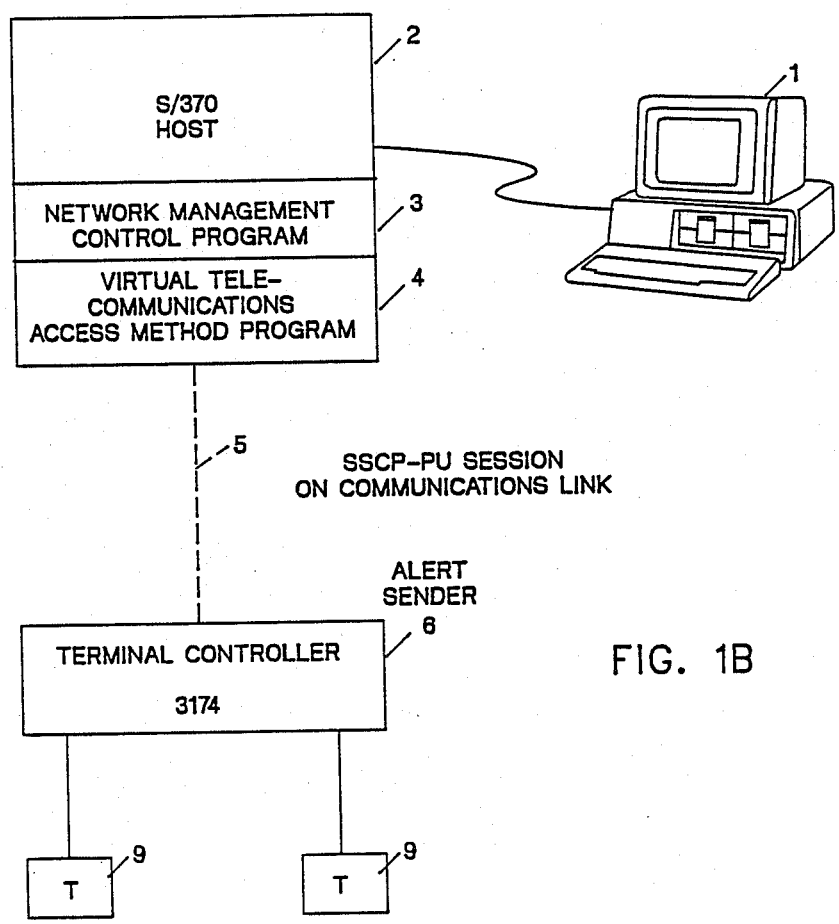
FIG. 1B schematically illustrates a preferred embodiment of the invention environment for an IBM System 370 host operating as the network management control point for communication to an SNA-based communication network.

As depicted in FIG. 1B, a typical alert sender might be an IBM 3174 terminal controller. Such controllers contain sophisticated processors capable of performing complex calculations such as those involved with well-known IEEE standard 802 cyclic redundancy checking algorithm ordinarily used for frame checking of communicated data in a network. Such a CRC algorithm checks the integrity of data that has undergone an operation such as transmission over a communications network link. The algorithm is used to generate check numbers for the data both before and after it has been transmitted and received. The integrity of the data is assumed to have been preserved if the check numbers at the transmitter and receiver match one another. As used in the present invention, however, the CRC algorithm is not employed for verifying the data integrity but is simply used as a mechanism for mapping the long, variable length bodies of data constituting the alert messages into fixed 32-bit numbers to create an identification for the variable length alert messages. The description given below details how the data used in the mapping is applied and further describes the exact procedure for performing the mapping together with a further step of concatenation that reduces to an acceptable level the probability of collisions, i.e., inadvertent duplications of an identification code from different alert senders.

As noted earlier, in order for a network control program product such as IBM's NPDA to provide a capability for filtering of the type defined above, there must be provided a way of representing an individual alert message that can be used for the NPDA internal processing and then an operator of the system can use for specifying a filter setting for that alert message. The alert record itself is typically large and different alerts differ in their length and content. Furthermore, not all differences between alert records are relevant to filter setting. For example, if two alerts differ only in the time stamps that they carry or in the name of the resource to which they apply, then from the point of view of filtering, they should be treated as identical. However, they would not be treated as identical unless they are given an identical identification code. There are other types of filtering for which the difference just mentioned may matter greatly since an operator may well wish to filter alerts from a given resource by the time of day at which they are received. Thus, the requirement exists for some method of representing an individual alert message that can be usable both at the network management service control station, i.e., the operator's console, and for a method of representing messages which also takes into account all but only those portions of the alert message that are relevant to the filtering task.

Figure 3A:
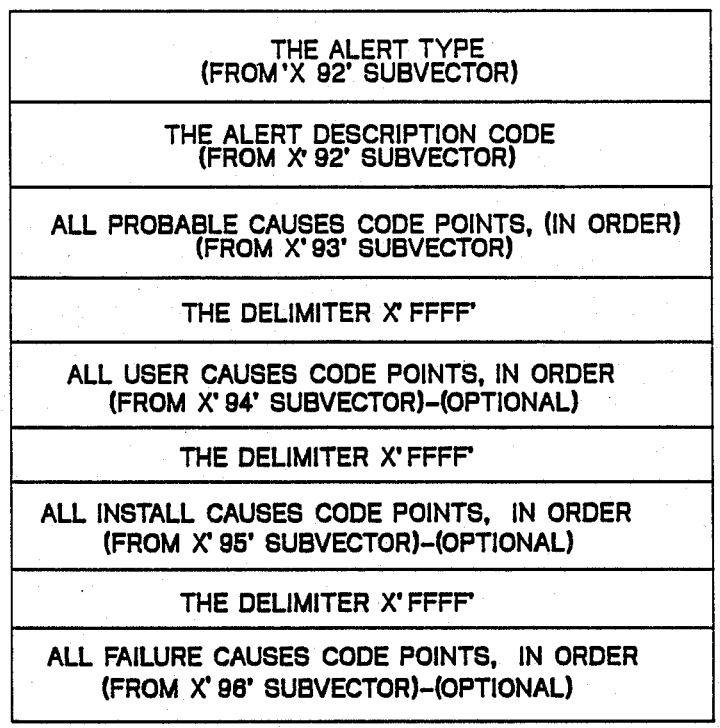
FIG. 3A illustrates, in order, the selection of data elements from an alert message to be inputted into a buffer prior to entry of the buffer contents into the IEEE 802 standard CRC algorithm calculation device.
Figure 3C:
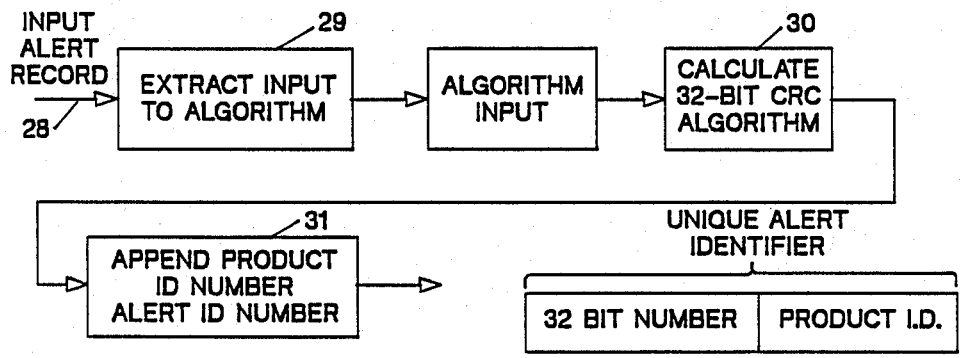
FIG. 3C illustrates schematically the basic process flow for generating a unique alert identification number.

The specific solution to this problem of the present invention is depicted schematically in FIG. 3C as a two-stage process for generating a unique alert identification number. As depicted in FIG. 3C from a generated alert message record, certain fields of data are extracted as an input to the CRC algorithm. The alert record 28 is inputted to the extraction means 29 which is a selector routine that selects from the NMVT formatted message certain prescribed bytes from identified subvectors as will be described in greater detail later. This creates input to the CRC algorithm for calculation in box 30. The IEEE 802 standard CRC algorithm is well known but is set out later herein for convenience. The result of calculating this algorithm utilizing the data input from box 29 is a 32-bit number to which is appended in box 31 a unique product identification code which results in an output of an alert message identifier.

FIG. 3C shows the format of an outputted alert identifier unique to a specific product and alert message.

FIG. 3A describes in tabular form the necessary fields to be extracted from the NMVT formatted message. The elements to be extracted constitute those fields representing the alert type from the hex 92 subvector in the NMVT, the alert description code from the hex 92 subvector and all probable cause code points in their order of appearance from the hex 93 subvector. This is to be followed in order by a delimiter as specified in FIG. 3A, all the user cause code points in their order of appearance from the hex 94 subvector (this subvector is optional and may be omitted), a further delimiter as shown in FIG. 3A and any install cause code points in their order of appearance, if any, from the hex 95 subvector. This is also followed by a further delimiter as shown in FIG. 3A and finally, by all the failure cause codes points as defined in order, if any, from the hex 96 subvector. This subvector is also optional as is the hex 95 subvector as noted in FIG. 3A. All of these code points for subvector 92 through 96 are completely architected and described in the aforementioned IBM publication GA27-3136.

Figure 3B:
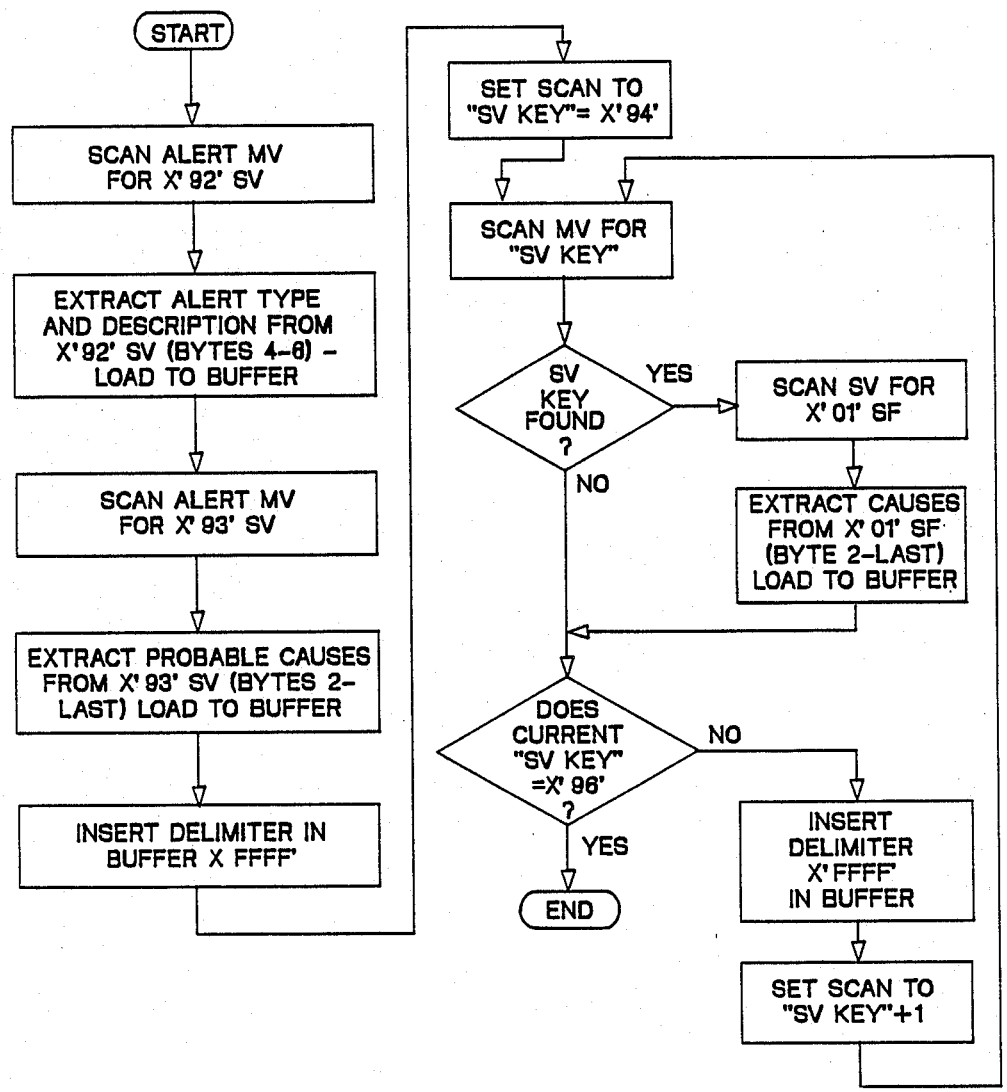
FIG. 3B illustrates schematically a program for generating a unique alert identification number in accordance with the preferred embodiment of the invention.

The procedure as depicted schematically in the flow chart in FIG. 3B operates as follows:

First, the elements of the alert record to be used in filtering are extracted from the subvectors as specified in FIG. 3A and placed into a variable length buffer in the specified order depicted in FIG. 3A. Delimiters are inserted to distinguish successive groups of elements from each other (the delimiters as shown in FIG. 3A). The result of this step is a mapping of alert elements into the buffer entries (such as in FIG. 4) in such a way that two independent alerts from different sources will constitute an identical buffer entry if, and only if, they should be treated as indistinguishable for filtering purposes. Next, turning to FIG. 3C, the buffer entry is run as a data input into a specified IEEE 802 standard CRC algorithm calculation device. The device may be either a commercially available CRC algorithm integrated circuit chip which calculates the result or it may be an appropriately programmed data processor. The output which results from the CRC algorithm calculation is a 32-bit binary number that is associated with the buffer entry. This number is inserted in the alert itself, so that it will be available to the alert receiver.

There are actually two different methods by which the first two steps indicated above can be implemented. An alert sending product may actually implement the CRC algorithm in its own processor or in its own code and generate the alert identification number for each alert on-line in real time as it is prepared for transmission. Alternatively, the alert sending product may be pre-coded with predefined alert ID numbers with the code points having been run through the algorithm generation process once in the course of product development. The resulting ID numbers can then be stored in the table within the product so that only a table look-up is necessary at the time it is necessary for sending a specific alert.

When it receives an alert, an alert receiver extracts two pieces of information from it: the identifier indicating the identity of the network product which sent the alert, and the 32-bit number resulting from step 2 above. The identifier, identifying the sending product, appears in the architecturally defined portion reserved for this purpose. These two are concatenated together to form the unique alert identifier depicted in FIG. 3C. The purpose of this step in the process is to reduce the probability of duplication of the unique identifiers from the mapping that is done in step 2. Since the buffer entries for alerts are always at least 5 bytes in length and typically may range from 15 to 25 bytes and perhaps may be as large as 80 bytes or more, the mapping of the entries into a 32-bit number is obviously not a perfect one-for-one mapping. By concatenation of the resulting 32-bit number with the identity of the sending product, the probability of duplication is enormously reduced since the set of all alerts flowing in a given network which may easily run into thousands of alerts will be partitioned in the sets associated with alert sending products in the network which typically are many fewer and may range between 10 and a few hundred. Therefore, the likelihood of duplication of the same alert message occurring from the same type of product at the same time for application to the network is very small.

The buffer entries are always ordered in accordance with the hex subvectors 92 through 96 as keys as depicted in FIG. 3A in accordance with this invention. The specific example for a specific type of product under specific assumed conditions is depicted in FIG. 4 where the buffer entries are shown in the order of their presentation. As the example indicates, the code entries that are placed in the buffer comprise only a small portion of the complete alert record given in FIG. 6 for the sample assumed condition. Only the code points that are characteristic of a particular alert condition have been selected in accordance with FIG. 3A. Other elements of the alert record, such as the time stamp, the sender's serial number, the SNA name or address, etc., that may differ for the same alert condition in the network are not included in the alert ID number calculation process.

Figure 5:
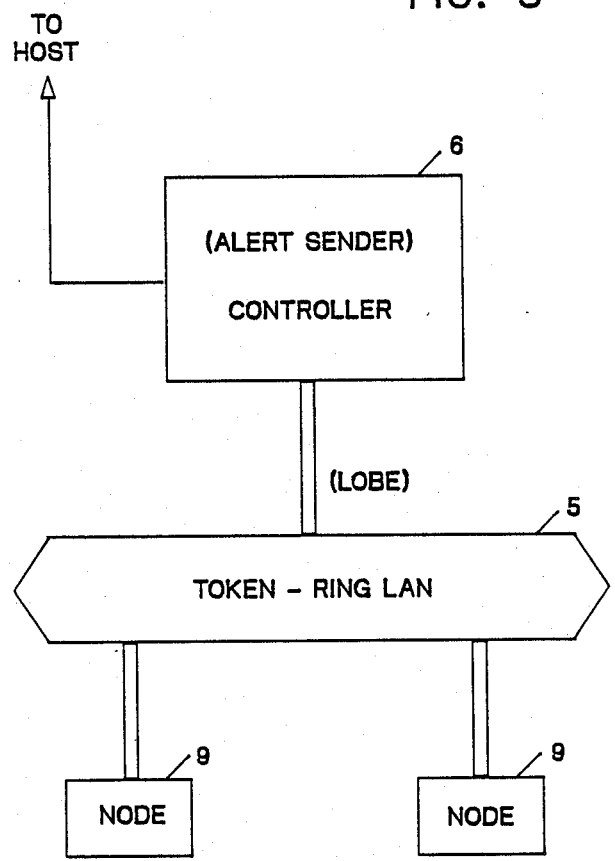
FIG. 5 illustrates schematically a portion of a typical communication/data processing network configuration in which a communication controller attached to a token ring network operates as the alert sender.

Turning to FIG. 5, a portion of a typical communications network in which the alert sender 6 is a token ring controller connected to a lobe of a token ring communication loop 5 and connected to individual terminals or work stations 9 is shown. The specific example assumed is that the alert sender 6 detects a wire fault in the token ring lobe 5 which is to be reported. FIG. 6, comprising FIG. 6A through 6C show the entire NMVT generic alert message that is constructed by the controller 6 to report a wire fault. The elements of the alert that are employed in the alert identification number calculation for input to the CRC algorithm are indicated in the figure. It may be noted that the entire alert message constitutes a message of 132 bytes length and that the individual bytes and bits having the specified hex values have the given meanings as shown in FIG. 6. All of these meanings and byte and bit values are fully defined in the published aforementioned IBM reference. Since the specific assumed example forms no part of the present invention, the full detail of the published reference defining all of the possible code points for types of errors and information to be reported in each case is not duplicated herein. However, for purposes of illustration, portions of the generic alert data X'92' alert subvector from the aforementioned reference are set out in FIGS. 7 and 8. It may be noted that the X'92' subvector has an encoding scheme in which X'1xxx' is reserved for hardware-related code point descriptions. A complete list of hardware-defined malfunction codes exists in the aforementioned document to specifically identify the nature of error and a variety of condition reports such as loss of electrical power, cooling, heating, etc.

Byte 0 of this subvector X'92' is the length pointer which contains, in binary form, a length pointer defining the length of the message. Byte 1 represents the key identifier encoded with the X'92' to identify this subvector as the hex subvector 92. Bytes 2 through 3 are flags in which bits 0 and bit 1 and bit 2 only are used as shown. Byte 4 is the alert type code which is a code point indicating the severity of the alert condition being reported. Five currently defined code points are used in this byte, although obviously many others are possible within the limitations of a single byte of data.

Bytes 5 and 6 are the alert description code which are code points that provide an indexed predefined text that describes the specific alert condition. Assignment of the code points is by the highest order hexadecimal digit with prefix digits 1 being reserved for hardware, 2 for software, 3 for communications errors, 4 for performance errors, 5 for traffic congestion, 6 for microcode errors, 7 for operator conditions or errors, 8 for specification errors, 9 for intervention conditions, A for problem resolved reports, B for notification, C for security, D (reserved) and E (reserved) for problems of undetermined origin.

In the aforementioned reference, the defined codes are completely specified and, although not repeated here in detail, include specific codes for equipment malfunctions that are further specified to the control unit, or the device, input or output device errors, specific type device errors such as printer error or cassette error, loss of electrical power with specific losses of electrical power to the channel adapter, line adapter, etc., loss of equipment heating or cooling, subsystem failures with specific identification of the failing subsystem, to name but a few of the hardware type errors that may be specified in these codes. Software code points are defined for software program abnormally terminated, or for software program errors. Communication protocol errors are defined in the X'3xxx' codes with SNA protocol errors, LAN errors, wire fault errors, auto removal errors, token ring inoperative reports, etc., being among those reported as well as link errors of various types, connection errors, etc. Performance reports are contained in the X'4xxx' code point and congestion in the system or network components having reached its capacity is reported in the X'5xxx' code point as defined in the aforementioned reference. Microcode program abnormalities and errors are reported in the X'6xxx' code point and operator procedural errors are defined in the X'7' code point. Configuration or customization errors such as generation of parameters that have been specified incorrectly or inconsistent with actual configuration are reported in the X'8xxx' code point. The X'9xxx' operator intervention messages are completely specifiable for a variety of conditions including low ink, low on paper, out of coins, etc. The X'Axxx' code points indicate the problem resolution X'Bxxx' are operator notification code point. X'C' are security event indicator code points. X'D' and X'E' 000 through X'E' FFF are reserved as defined in the aforementioned reference.

Finally, bytes 7 through 10 are the alert ID number itself, which is the 4-byte hexadecimal value computed in accordance with the instruction as set out in the Figures. The alert ID number is defined for this invention to be the number representing the remainder in the polynomial field R(X) resulting from the CRC generation algorithm of the IEEE 802 standard To the alert ID number is concatenated the product ID from hex subvector 11.

In similar fashion, although not set out herein at all, the hex subvector 93 through 96 contents are completely defined for each possible code point in the aforementioned reference. It is from these subvectors that, in accordance with the instruction depicted in FIG. 3A, specific fields or code points are extracted for input to the CRC generation algorithm.

As will be apparent from FIG. 6, it is an extremely simple proposition to construct a buffer entry as shown in FIG. 4 from the input alert message. All that is required is to search the alert message string until the X'92' generic alert data subvector key is found, scan the bytes in the X'92' subvector, extracting codes for the alert type (formed at byte 78 in FIG. 6)and for the alert description code (formed at byte 78 and 79 following the alert type). Next, the probable causes subvector X'93' is searched for and found at byte 86 whereupon scanning for the identified probable cause at the next bytes 87 and 88 yields an encoded probable cause code point. A delimiter X'FFFF' is then inserted from a fixed register in accordance with the format shown in FIG. 3A and will appear as shown in FIG. 4. The delimiter X'FFFF' is inserted again. Next, it is necessary to search for the hex subvector 94 for any encoded user causes. In the case illustrated in FIG. 6, there are no encoded user causes so hex subvector 94 does not appear in the message. Next, a search is made for the install causes in hex subvector 95 which similarly is not present in FIG. 6 since in the assumed example, no install causes are encoded. The delimiter X'FFFF' is inserted a third time. Finally, failure cause code points from the hex subvector 96 are sought. These are found beginning at byte 90 in FIG. 6 and the specific encoded causes are found at bytes 93-94, 95-96, and 97-98, which identify in order that the local access unit is the cause, that it is the local lobe cables at the access unit and that it is the local token ring adapter which may be involved.

The Network Management Vector Transport Alert major vector format is illustrated in FIG. 7 and shows the order of assembly for the alert major vector depicted schematically in FIG. 2. As is apparent from FIG. 7, the generic alert data appears in hex subvector 92 and is present at each occurrence of the alert major vector. Probable causes will be encoded at a hex subvector 93, the user causes will appear at subvector 94, etc. The format for the location of information within each hex subvector is fully defined as shown by the example given for the X'92' alert subvector previously discussed. The alert type will be found at byte 4 within the X'92' subvector, the alert description code at bytes 5 and 6. In the example shown in FIG. 6, the X'92' subvector actually begins at byte 74 with the generic alert data subvector length indicator followed, at byte 75, by the second byte within the subvector, which is the subvector key identifier for X'92'. The alert type is therefore found at byte 78, the fourth byte from the beginning, and the alert description code is fund a bytes 79-80, the fifth and sixth bytes, respectively, from the beginning of this subvector. The formats for the hex subvectors 93, 94, 95, 96, which are necessary for building the input to the buffer for eventual input into the CRC algorithm calculator are thus rigidly prescribed in advance.

As is evident from the foregoing, the use of the IEEE standard 802 CRC algorithm results in a standard 32-bit binary output which may be appended to the product ID code to provide a unique alert message identifying indicator which can be used for all of the valuable filtering functions alluded to earlier and which avoids the necessity of generating individual descriptor screens for each product and for each type of failure for that product in a coordinated fashion to be communicated between the host network management control program facility and the user. Instead, the users may select descriptive alert condition codes from the published all inclusive lists thereof for transmission to the host system. These unique identifiers may be generated in advance and stored in a tabular form for look-up when specific error conditions are detected by the alert sender. This avoids the step of actually calculating the CRC algorithm result each time.

Having thus described our invention with reference to a preferred embodiment thereof, it will be apparent to those skilled in the art that numerous departures in implementation may be made without affecting the basic concept of utilizing a CRC algorithm calculation for digesting the long variable length error message or alert message codes into a unique and recognizable form for quick filtering and handling options by the host system. Therefore, what is contained in the claims below is by way of description and not by way of limitation.

What is claimed is:

1. A method of generating a fixed length, unique alert message identifier for unique combinations of plural data field contents in a plural data field variable length alert message report record, said record comprising an alert type field, an alert description code field, one or more probable cause code fields, one or more delimiter code fields, one or more user cause code fields, one or more install cause code fields, and one or more failure cause code fields, said method comprising steps of:
   extracting from said record the entire contents of a selected subplurality of said data fields;
   placing said contents of said selected subplurality of data fields into a storage queue;
   inputting the contents of said storage queue to a cyclic redundancy check generation device;
   generating in said cyclic redundancy check device a fixed length unique data field from the contents of said storage queue; and
   concatenating a product identification code field to said fixed length unique data field, thereby constructing a unique alert message identifier.

2. A method as described in claim 1 wherein, said cyclic redundancy check generator utilizes the IEEE standard 802 CRC generation algorithm.

3. A method as described in claim 1 or claim 2, wherein said step of extracting comprises:
   extracting the contents of said alert type field, said alert description code field, said probable cause code or codes field in their order of occurrence, a first said delimiter code field, said user cause code or codes field in their order of occurrence, a further said delimiter code field, said install cause code or codes field in their order of occurrence, a further said delimiter code field, and said failure cause code or codes fields, in their order of occurrence.

4. In a communications and data processing system having means for generating a unique alert report for conditions to be brought to a system operator's attention, improved means for generating a unique alert report identifier, comprising:
   means for concatenating physical unit condition status and operational performance data codes into a record constituting data arranged as a plural data field physical unit alert report;
   means for selecting a subplurality of said data fields from said alert report;
   means connected to said selecting means for receiving and storing said selected data fields; and
   means connected to said receiving and storing means for calculating the polynomial remainder utilizing the IEEE standard 802 cyclic redundancy algorithm, said remainder being said unique alert report identifier.

5. Apparatus as described in claim 4, further comprising:
   means for concatenating a physical unit identification code to said alert report identifier to constitute an alert report identification code.

6. A method of uniquely identifying a variable length alert message sent from an alert sender to a system network management controller, comprising steps of:
   obtaining, for a queued stream of alert message components, the 32 bit numerical remainder achieved by calculating the IEEE standard 802CRC algorithm;
   obtaining the numerical complement of said 32 bit numerical remainder; and,
   concatenating to said 32 bit numerical complement an encoded identification of said alert sender, thereby constructing a code consisting of said encoded identification and said 32 bit numerical compliment.

* * * * *